Jan. 22, 1957     P. DECKER     2,778,717
PROCESS AND APPARATUS FOR THE SEPARATION OF MIXTURES
OF SUBSTANCES BY CONTINUOUS COUNTERCURRENT
DISTRIBUTION IN SOLVENTS
Filed Nov 20, 1951
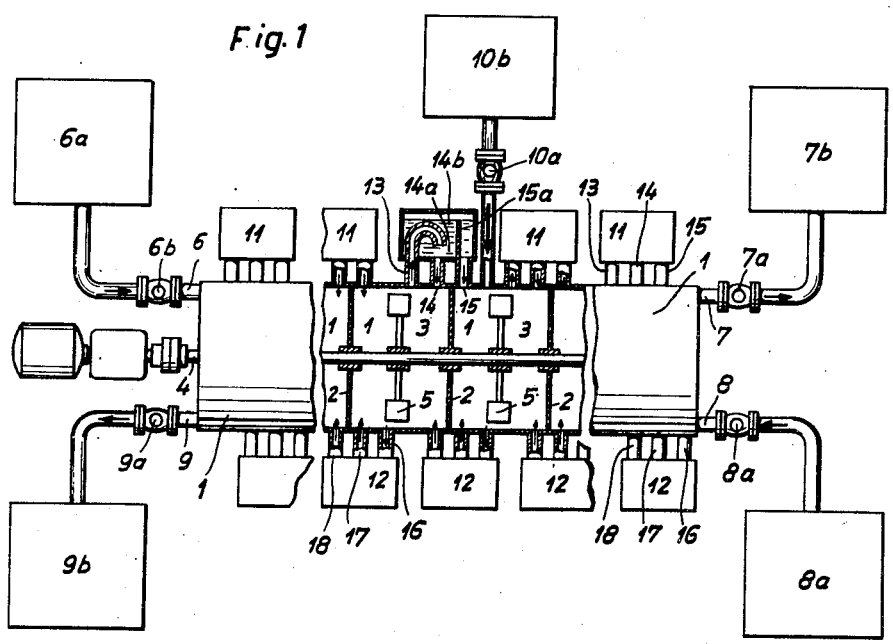
INVENTOR
Peter Decker
by
Atty

United States Patent Office 2,778,717
Patented Jan. 22, 1957

2,778,717

PROCESS AND APPARATUS FOR THE SEPARATION OF MIXTURES OF SUBSTANCES BY CONTINUOUS COUNTERCURRENT DISTRIBUTION IN SOLVENTS

Peter Decker, Munich, Germany

Application November 20, 1951, Serial No. 257,388

Claims priority, application Germany November 21, 1950

5 Claims. (Cl. 23—310)

The present invention concerns a process for the separation of mixtures of substances by continuous counter-current distribution in solvents of different specific gravities.

Processes for the separation of mixtures by continuous counter-current distribution are known whereby two solvents which are imiscible or miscible only to a limited degree and which are of different specific gravities are brought into contact with one another in counter-current. The counter-current distribution was carried out in an appropriate separation apparatus and the mixture of substances to be separated were added at a position situated between the inlet and outlet positions of the solvents. Dependent upon the separation coefficients of the substances to be separated and of the proportion of the quantity of solvent flowing through per unit of time, the mixture is separated into two fractions, which leave the separation apparatus with both the solvents.

Similar counter-current processes with selective solvents have been used in the mineral oil industry for the separation of aromatic and aliphatic hydrocarbons. On account of the great differences of the separation coefficients of the substances to be separated no particularly high requirements are demanded regarding the degree of selectivity with these processes.

In processes, where it was desired to obtain a greater selectivity the solvents were passed in counter-current through a greater number of mixing and separating chambers with the aid of appropriate pumps. Other similar processes operate with separation columns, which are filled with a solvent, whilst the second solvent is passed through the first solvent, whereby the attempt was made to obtain uniformity of the flow-through by means of agitator and separation chambers alternately placed inside the columns or by filling materials.

Also processes for counter-current treatment have already been described, in which the solvents are horizontally conducted past one another, whereby they are alternately passed through mixing chambers, where they are brought into intimate contact by stirring, and then fed through separation chambers, wherein they are again separated from one another.

The process according to the invention for the separation of mixtures of substances, in which two solvents of different specific gravities, which are mutually insoluble or only partially soluble, are horizontally conducted past one another in counter-current in a separation apparatus and the mixture of substances to be separated is added at a position in the apparatus situated between the inlet and outlet positions of the solvents, is characterised in that, both the solvents are intimately mixed with one another along a zone, which comprises their total contact surface, for the purpose of accelerating the establishment of the equilibrium of distribution. The intimate mixture of both the solvents is effected for example by suitable agitation devices.

To increase the separation action it is expedient to subdivide the contact zone of both solvents into individual mixing chambers by separating walls, which are fitted at right angles to the direction of movement of the solvents. The arrangement of the separating walls must however differ from the known processes in that the intimate mixtures of the solvents along their whole contact surface is not influenced. The separating walls have above and below outlets, whereby deflector plates can also be fitted in each mixing chamber. The separating walls can however also be full-length, whereby then a separating device is fitted above and below each of the mixing chambers for the solvents of higher specific gravity and of lower specific gravity which are connected with the previous or subsequent mixing chamber.

The velocities of flow are chosen according to the separation coefficients of the components to be separated in both the solvents. If the differences between the separation coefficients are great, then less mixing chambers are necessary than when the differences are only very small.

Compared with the counter-current processes used until now operating with pumps the present process has the advantage, that a greater number of mixing chambers can be used without the use of pumps. On account of the intimate mixing taking place along the whole contact surface of the two solvents flowing past one another, a remarkably greater selectivity is obtained than with the known processes. Compared with processes, which operate with separating columns, the advantage is considerable, in that a uniform ratio of flow of the two solvents is ensured in each mixing chamber of the separating apparatus. This is an important condition for the selectivity. Convection currents, which reduce the separating effect in separation columns, cannot occur in the process according to the invention.

Compared with the known horizontal devices the process according to the invention has the advantage, that the length of the separation apparatus can be kept smaller since the hitherto used common separating chambers for the two solvents which were fitted between the mixing chambers are abolished. When separating chambers are used, they are fitted separately for each of the two solvents, above and below each one of the mixing chambers, whereby simultaneously a more effective separation of the other solvent contained in the one solvent can be obtained.

A simpler control of the flow ratio within the separating apparatus is also obtained since only the supply and discharge of the solvents requires to be regulated. Compared with the previous processes there is thus achieved either a greater flow-through with the same number of mixing chambers or a better separating efficiency when using a greater number of mixing chambers.

With the process according to the invention all substances can be separated, whose separation coefficients differ appreciably into two immiscible solvents or only limited miscible solvents. On account of the use of a greater number of mixing chambers the process is also suitable for the separation of substances, whose separation coefficients only differ slightly from one another.

The quantitive ratio of the solvents flowing per unit of time through the separating apparatus also plays an important part in the process according to the invention. According to its adjustment and in particular according to whether the product of the quantity ratio of the solvent and the separation coefficient of a substance is greater or less than 1, the substances leaves the apparatus more or less completely with one or other of the solvents.

With multi-mixtures of substances each of the fractions obtained can by repetition of the process be split up further with another flow ratio.

In the case of weak acids or weak bases besides the separation coefficients, differences in the dissociation constants can also considerably contribute to the separation. By separating the substances to be separated between an organic solvent and a buffer solution of determined pH-value it comes about, that difference in the products of the separation coefficients and dissociation constants render a separation possible.

The apparatus for the carrying out of the process according to the invention consists essentially of a horizontally arranged chamber divided into separate mixing chambers, which has feed and discharge openings for the solvents of lighter and heavier specific gravity. In the contact zone of the two solvents a full-length shaft is mounted which is provided with agitators for each mixing cell. Apart therefrom there is also between the inlet and discharge openings for the solvents a feed opening for the mixture to be separated.

Two examples of devices according to the invention are described in more detail in Figures 1 and 2 of the attached drawings.

In the apparatus according to Figure 1, the separating chamber or enclosure 1 is divided by partitions 2 into individual mixing chambers 3. Along the contact surface of the solvents of lighter and heavier specific gravity the shaft 4 is fitted, which is provided with the agitating vanes 5. The number of these agitating vanes corresponds to the number of available mixing chambers. The lighter solvent enters from the storage tank 6a through the inlet opening 6 through the regulating valve 6b into the upper part of the separating apparatus and leaves same through the discharge opening 7, through the regulating valve 7a into container 7b. The heavier solvent is passed through the inlet opening 8 of the storage tank 8a through the regulating valve 8b and the discharge opening 9 through the regulating valve 9a into the container 9b through the lower part of the separating apparatus. The mixture to be separated flows through the feed opening 10 and the regulating valve 10a from the tank 10b into the separating chamber. Each mixing chamber 3 is in communication with two separating chambers 11, which are arranged above it and two separating chambers 12, which are arranged below it. In the upper part of the separating apparatus the emulsion resulting by agitating the two solvents passes from the mixing chamber 3 through the conduit 13 into the separating chamber 11. Here the heavier solvent 14a is separated and led back through the conduit 14 into the mixing chamber 3, whilst the lighter solvent 14b is fed through the overflow 15a and the conduit 15 into the next mixing chamber. In the lower part of the separating apparatus the emulsion arising from both the solvents is passed from the mixing chamber 3 through conduit 16 into the separating chamber 12. Here the lighter solvent is separated and led back through conduit 17 into the mixing chamber 3. The heavier solvent passes through conduit 18 into the next mixing chamber. The construction of the separating chamber 12 corresponds to that of the chamber 11. The cross section of the mixing chambers can be round or square. Of course a different construction of the separating chambers is also possible.

In the device according to Figure 2 the separating chambers are incorporated in the mixing chambers. The partitions 19 fitted in the chamber 1 have apertures 19a above and below through which the solvents can pass over into the appropriate adjoining mixing chamber. Through the fitting of deflector plates 20 the return of the two solvents is brought about in the region of the agitating device. In this figure the corresponding parts of Figure 1 are marked with the same reference numerals.

In the upper part of the separating apparatus a separation takes place in the separating chamber 21 of the emulsion arising from the two solvents and the heavier solvent remains in the appropriate mixing chamber, whilst the lighter solvent passes through the upper apertures 19a of the partitions 19 into the subsequent mixing chamber.

In the lower part of the separating apparatus the corresponding separation of the emulsion resulting from the two solvents is effected in the separating chambers 22 in such a way that the lighter solvent remains in the appropriate mixing chamber whilst the heavier solvent passes via the lower apertures 19b of the separating wall 19 into the adjoining mixing chamber.

The cross-section of the apparatus is in this case rectangular on account of the incorporation of the separating chambers in the mixing chambers.

The front and rear walls of the separating apparatus according to the invention can consist of a transparent material, e. g. glass, which enables an observation to be made of the processes taking place in the apparatus.

The contact surfaces between the two solvents extend practically horizontally, when the solvent slowly flow through the separating apparatus. With greater rates of flow however there occur on account of the resistance to flow present in the apparatus, differences in level between the individual mixing chambers, as is schematically shown in Figure 3. To equalise these differences in level the separating apparatus is preferably equipped with a tilting device, which makes it possible to compensate the existing differences of level. This tilting device is schematically shown in Figure 3, consisting by way of example of a shaft 25, on which the apparatus can be adjusted to the required angle of incline by means of the levelling screw 27 through a stirrup 26. The shaft is supported in a bearing block 28. Thereby the contact surfaces between the two solvents are again brought in the range of the agitators in all mixing chambers.

The apparatus according to the invention can also be used for the liberation from liquids of substances dissolved therein, e. g. for the separation of alkaloids from extracts, for the separation of impurities from mineral oil distillates and the like. For this purpose one of the two solvents is replaced by the liquid from which it is desired to separate the substance contained therein. However, one can also add an auxiliary solvent to the liquid concerned. The inlet opening provided for the mixture to be separated is then shut down. Such a method is to be considered as counter-current extraction with a selectively acting solvent.

The carrying out of the above process will be further explained with the aid of a few embodiments by way of example.

*Example 1*

Through the distribution of carbon disulphide and methyl alcohol a mixture between tristearin and triolein are separated. The separation is carried out in an apparatus as is shown in Figure 2. The same has eleven mixing chambers and has a total volume of about 160 ccs. The feed rate of the methanol amounts to 20 ccs. per minute and that of the carbon disulphide 2 ccs. per minute. To the centre of the available mixing chambers a mixture of equal parts of tristearin and triolein in chloroform is admitted at a rate of 0.2 ccs. per minute. The methanol leaving the apparatus contained 97% of the triolein and the carbon disulphide 99% of the tristearin.

*Example 2*

The separation of a mixture, which consists of one part of naphthalene and one part of tetralin, are effected by distributing between petroleum ether and a 95% methanol in an apparatus according to Figure 1. The methanol was admitted at a speed of 19 ccs. per minute and the petroleum ether at one of 10 ccs. per minute. The mixture to be separated entered in the central mixing chamber at a speed of 0.4 ccs. per minute. The methanol leaving the separating apparatus brought with it over 80% of the naphthalene and the petroleum ether over 80% of the tetralin.

*Example 3*

To separate a mixture of phenol and its homologues by consecutive distribution between cyclohexane with various buffer solutions the process is as follows:

a. For the purpose of separating the phenol a buffer solution of pH=6 is passed into a separating apparatus according to Figure 1 at a speed of 9.5 ccs. per minute and cyclohexane with one of 20 ccs. per minute. The mixture to be separated is introduced into the central mixing chamber at a speed of 0.8 ccs. per minute. 95% of the phenol goes into the buffer solution, while in the cyclohexane 95% p- and m-cresol and over 99% of the remaining homologues of phenol are contained.

b. The separation of the m- and p-cresol from the remaining homologues of phenol is carried out in the same apparatus. A buffer solution with a pH=6 is added at a speed of 20 ccs. per minute and cyclohexane at 9.5 ccs. per minute. The feed of the mixture to be separated takes place at a speed of 0.6 ccs. per minute. Under these conditions about 90% of m- and p-cresol pass into the buffer solution. The o-cresol is found in about equal parts in both the solvents. In the cyclohexane there is contained up to 90% m- and p-ethyl phenol and 3.5 xylenol and over 99% of the remaining higher phenol homologues.

c. The same apparatus is also used for the separation of different xylenols and ethyl phenols. Buffer solution of pH=12 is introduced into the apparatus at a rate of 13.5 ccs. per minute and cyclohexane at 20 ccs. per minute. The feed rate of the mixture to be separated amounts to 0.8 ccs. per minute. p- and m-ethyl phenol and 3.5-xylenol of about 90% pass into the buffer solution. Into the cyclohexane there goes over 99% of any cresols present and any phenol present about 90% o-ethyl phenol, 2.4 xylenol and 2.5-xylenol and over 99% of 2.6-xylenol.

*Example 4*

For the preparation in pure state of decalin from a decahydronaphthalene - tetrahydronaphthalene - naphthalene mixture with about 50% decalin content by counter-current extraction an apparatus according to Figure 1 is used. The mixture to be separated is added to a quantity of 20% petroleum ether and this mixture passed through the apparatus at a speed of 5 ccs. per minute. A 95% methanol is used as second solvent, which flows through the apparatus at a speed of 20 ccs. per minute. Practically pure decalin leaves the apparatus with the petroleum ether. A mixture passes into the methanol, which apart from a little decalin contains 92% of the tetralin and over 99% of the naphthalene.

What I claim is:

1. Process for the separation of mixtures of substances by continuous counter-current distribution in solvents, in which two solvents with different specific gravities, which are insoluble or only partly soluble with one another are conducted in contact past one another horizontally in counter-current flow and the mixture of substances to be separated is fed at a position situated between the inlet and discharge positions of the solvents, which comprises passing the solvent of lesser specific gravity horizontally along the upper part of said apparatus in one direction and passing the solvent of greater specific gravity horizontally along the lower part of said apparatus in the opposite direction, flowing said solvents through a plurality of closely adjacent mixing spaces, agitating said solvents along the whole contact surface of said solvents, said solvents flowing from one mixing space to the next adjacent mixing space through upper and lower separating zones outside of and separate from said mixing spaces, removing said solvents from the top of said one mixing space, introducing said removed solvents into an upper separating zone, whereby the lighter solvent is separated from droplets of the heavier solvent, feeding back the heavier solvent into said one mixing space and passing the lighter solvent into the adjacent mixing space, simultaneously removing said solvents from the bottom of said one mixing space, introducing said bottom removed solvents into a lower separating zone, whereby the heavier solvent is separated from droplets of the lighter solvent, feeding back the lighter solvent from said lower separating zone into said one mixing space, and passing the heavier solvent from said lower separating zone into the adjacent mixing space.

2. In an apparatus for the separation of mixtures of substances by continuous counter-current distribution in solvents comprising a horizontally positioned separating enclosure, an inlet for light solvent at the upper part of one end of said enclosure and an outlet for said solvent at the upper part of the opposite end, an inlet for heavy solvent at the lower part of said opposite end and an outlet for said solvent at the lower part of said first end, an inlet for material to be treated at an intermediate part of said enclosure, and agitating means in said enclosure, the improvement which comprises a plurality of transverse partitions in said enclosure forming a set of independent alined mixing chambers, a pair of separating chambers intermediate adjacent mixing chambers, one of said pair being above and the other of said pair being below said enclosure, each of said pair having a duct leading from one of said adjacent mixing chambers and also having a duct leading to the other of said adjacent mixing chambers, means in said separating chambers for returning solvent to their respective mixing chambers through said ducts, said means adapted to return said light solvent to said one mixing chamber and said heavy solvent to said other mixing chamber, a shaft extending through said mixing chambers, and agitators on said shaft in each of said mixing chambers, and an inlet for mixture to be separated into an intermediate mixing chamber.

3. In apparatus according to claim 2, the improvement which comprises each of said ducts leading from a mixing chamber to a separating chamber being of gooseneck form.

4. In apparatus according to claim 2, the improvement which comprises a baffle in each separating chamber between the inlet and exit duct thereof.

5. In apparatus according to claim 2, the improvement which comprises a baffle in each separating chamber between the inlet and exit duct thereof, and a return duct from each separating chamber to said one mixing chamber.

References Cited in the file of this patent

UNITED STATES PATENTS

| | | |
|---|---|---|
| 1,297,171 | Holley et al. | Mar. 11, 1919 |
| 1,953,618 | Kramer | Apr. 3, 1934 |
| 2,029,688 | Wilson | Feb. 4, 1936 |
| 2,084,342 | Houghton | June 22, 1937 |
| 2,154,713 | Van Wijk | Apr. 18, 1939 |
| 2,266,521 | Van Dijck | Dec. 16, 1941 |
| 2,405,158 | Mansing | Aug. 6, 1946 |
| 2,580,010 | Fenske et al. | Dec. 25, 1951 |